ROBERT V. SHOCKEY.

Improvement in Insect Destroyers.

No. 122,541.            Patented Jan. 9, 1872.

Witnesses.

Inventor,
Robt V Shockey

UNITED STATES PATENT OFFICE.

ROBERT V. SHOCKEY, OF MOUNT PLEASANT, IOWA.

IMPROVEMENT IN INSECT-DESTROYERS.

Specification forming part of Letters Patent No. 122,541, dated January 9, 1872.

SPECIFICATION.
*To all whom it may concern:*

Be it known that I, ROBERT V. SHOCKEY, of Mount Pleasant, in the county of Henry and State of Iowa, have invented a new and useful Device for Catching Potato-Bugs and other Vine Pests; and I do hereby declare that the following is a full, clear, and exact description thereof, reference being had to the accompanying drawing and to the letters of reference marked thereon.

The nature of my invention consists in the construction of a horizontal cylinder having an opening on its upper side for receiving a flaring hopper-like vessel to collect the animals as they are beaten off from the plant. On the upper sides of the cylinder, where it connects with the hopper, flanges, projecting forward to prevent the animals from escaping when they have dropped into the cylinder, are connected. At one end of the cylinder is a door, out of which the animals can be conveniently washed.

Figure 1:
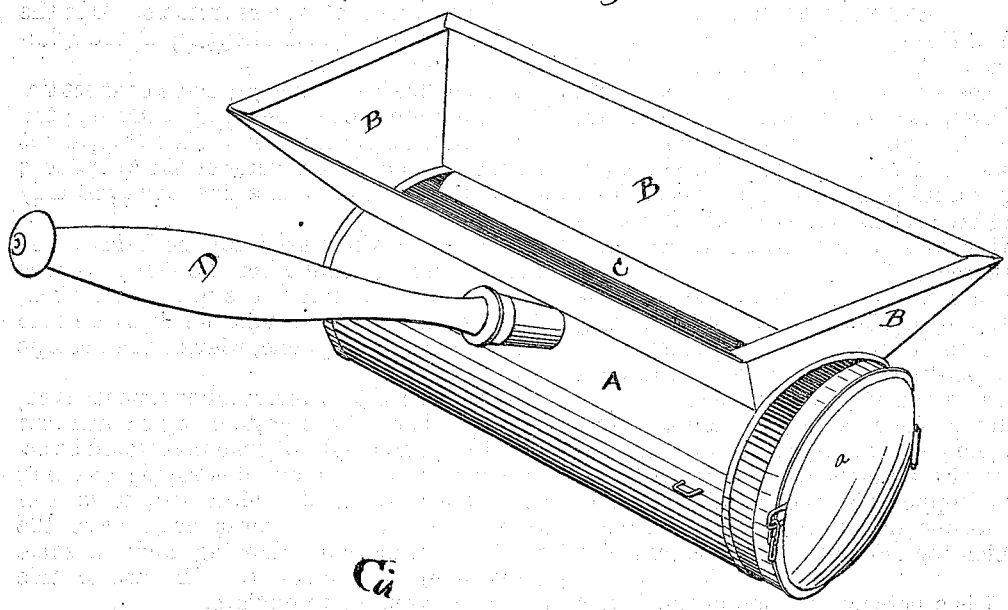
Figure 2:
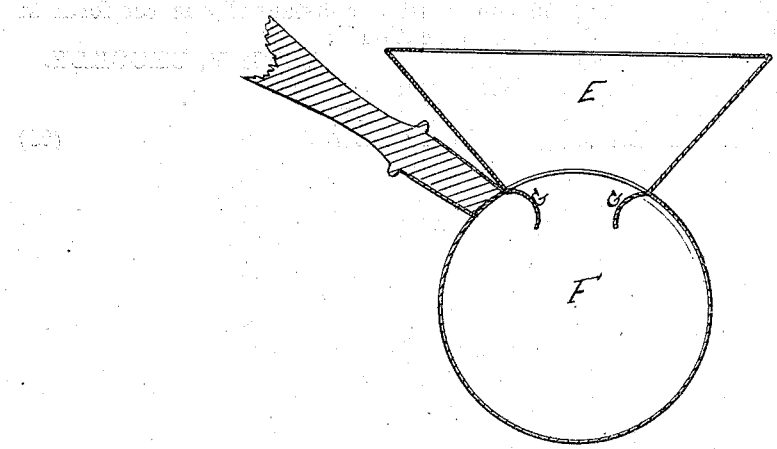

Figure 1 is a perspective view of the device embodying my invention. Fig. 2 is a sectional view of the same.

A is the cylindrical receptacle. B B B is the hopper. *a* is the door for withdrawing the animals. C is one of the flanges, which extend the whole length of the inner border of the hopper, and are concave below, as seen in Fig. 2, so as to prevent the escape of the insects that have fallen into the receptacle. D is the handle. E, Fig. 2, is the hopper; F, the cylinder; G G, the flanges.

This device can be cheaply made of sheet tin. It is about fourteen inches long at the top; ten inches at the cylinder. In width, at top, about six inches, and the diameter of the cylinder is about three inches. The size, however, may be varied.

The device when used can be held in one hand, while with the other the vines, whence it is intended to remove the pest, are shaken, the pest dropping through the aperture into the cylindrical receptacle, whence their escape is impossible.

By the use of this device much time is saved, large numbers of the pests being shaken into it in the same length of time that would be occupied in removing and destroying one bug when done by hand. Moreover, it is well known that many of these bugs have the power of inflicting annoying and, in some cases, dangerous bites; this the use of this device is intended to obviate.

What I claim as my invention is—

The cylinder, the hopper, and the flanges in combination, substantially as set forth in the specification.

ROBT. V. SHOCKEY.

Witnesses:
L. D. GALE,
W. M. MEW.

(63)